(12) United States Patent
Moonka et al.

(10) Patent No.: US 10,268,739 B1
(45) Date of Patent: *Apr. 23, 2019

(54) USER-LIST MANAGEMENT

(71) Applicant: Google Inc., Mountain View, CA (US)

(72) Inventors: Rajas Moonka, San Ramon, CA (US); Alexei Y. Barski, Mountain View, CA (US); Alan Eneev, Sunnyvale, CA (US); Anurag Agarwal, Sunnyvale, CA (US); Kuldeep M. Gharat, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/679,654

(22) Filed: Aug. 17, 2017

Related U.S. Application Data

(63) Continuation of application No. 15/343,898, filed on Nov. 4, 2016, now Pat. No. 9,740,756, which is a continuation of application No. 13/482,692, filed on May 29, 2012, now Pat. No. 9,514,186.

(51) Int. Cl.
| | | |
|---|---|---|
| *G06F 17/30* | (2006.01) | |
| *G06Q 50/18* | (2012.01) | |
| *G06F 3/0482* | (2013.01) | |

(52) U.S. Cl.
CPC ........ *G06F 17/3056* (2013.01); *G06F 3/0482* (2013.01); *G06Q 50/184* (2013.01)

(58) Field of Classification Search
CPC .................................................... G06Q 30/00
USPC ........................................................ 707/805
See application file for complete search history.

(56) References Cited

U.S. PATENT DOCUMENTS

| | | | |
|---|---|---|---|
| 7,418,323 B2 | 8/2008 | Andrushenko et al. | |
| 7,640,343 B2 | 12/2009 | Scott, III et al. | |
| 9,024,864 B2* | 5/2015 | Dunton | G06F 3/0482 345/156 |
| 2002/0055870 A1 | 5/2002 | Thomas | |
| 2003/0171942 A1 | 9/2003 | Gaito | |
| 2006/0271524 A1* | 11/2006 | Tanne | G06F 17/30648 |
| 2007/0106659 A1* | 5/2007 | Lu | G06F 17/30554 |
| 2007/0124465 A1 | 5/2007 | Malloy et al. | |
| 2007/0185858 A1* | 8/2007 | Lu | G06F 17/30864 |
| 2009/0012852 A1 | 1/2009 | O'Kelley et al. | |
| 2009/0147306 A1 | 6/2009 | Sugiyama | |
| 2009/0198735 A1 | 8/2009 | Yu | |

(Continued)

*Primary Examiner* — Baoquoc N To
(74) *Attorney, Agent, or Firm* — Fish & Richardson P.C.

(57) ABSTRACT

The subject matter of the disclosure is embodied in a method that includes identifying a user-list which is based on owned or permissioned data, wherein the user-list is associated with a corresponding owner database. The method also includes providing an application programming interface (API) configured to communicate with the owner database, and receiving, from the owner database through the API, metadata related to the user-list. The metadata at least includes data describing a category for the user-list. The method further includes storing in a searchable database a user-list identifier corresponding to the user-list and the associated metadata, and providing a user-interface that includes the user-list identifier and the corresponding associated metadata. The user-interface is configured to receive one or more management instructions related to the user-list from a user-list subscriber.

20 Claims, 12 Drawing Sheets

(56) References Cited

U.S. PATENT DOCUMENTS

| | | |
|---|---|---|
| 2009/0228397 A1 | 9/2009 | Tawakol et al. |
| 2010/0042465 A1 | 2/2010 | Pritchard et al. |
| 2010/0162175 A1* | 6/2010 | Lee ................... G06F 3/0482 715/860 |
| 2010/0211960 A1 | 8/2010 | Sirajuddin et al. |
| 2010/0226286 A1* | 9/2010 | Rossotto ........... H04L 29/06027 370/259 |
| 2011/0022592 A1 | 1/2011 | Brindisi |
| 2011/0138304 A1 | 6/2011 | Ungerman |
| 2011/0225015 A1* | 9/2011 | Spivack ........... G06Q 10/06314 705/7.24 |
| 2011/0276371 A1* | 11/2011 | Norcross ................ G06Q 30/00 705/14.1 |
| 2011/0289422 A1* | 11/2011 | Spivack ............... G06Q 10/109 715/739 |
| 2012/0054009 A1* | 3/2012 | Furman .............. G06Q 30/0252 705/14.5 |
| 2012/0054189 A1 | 3/2012 | Moonka et al. |
| 2012/0059706 A1 | 3/2012 | Goenka et al. |
| 2012/0166308 A1 | 6/2012 | Ahmed et al. |
| 2013/0318162 A1 | 11/2013 | Wright |

* cited by examiner

Recommended segments

Provided by User5 — 282
International business travelers ★★★★☆
Based on this segment: Business travelers / $5.15 CPM / User6
$4.75 CPM — 280
Buy this segment — 284    Dismiss — 285

Provided by User7 — 288
In-market traveler to Western Europe  Not yet rated
Added this month, based on category: travel
$2.5 CPM — 286
Buy this segment — 290    Dismiss

— 274

⊕ Filters — 272
Category includes "travel", CPM <= $5

Quick filters based on your current 8 segments
4.5 to 5 star reviews (58)  better coverage (11)  comparable, lower-cost alternatives (2) — 276
Added this month (18)  comparable, better quality (26)  income (42)

367 Available Segments — 254    Choose Columns — 270

| Name — 266 | Provider | CPM (USD) — 256 | Category — 258 | Average review — 260 | Users — 262 |
|---|---|---|---|---|---|
| Adventure travel in-market | User5 | 2.25 | travel | ★★★★★ | 154K |
| Airline credit card holders | User4 | 2.3 | financial, travel | ★★★★★ | 321K |
| Asian business travelers | User3 | 4.975 | travel | ★★★★☆ | 363K |
| Frequent flyers – big revenue | User5 | 4.5 | travel | ★★★★☆ | 421K |
| Frequent flyers – low revenue | User5 | 4.5 | travel | ★★★☆☆ | 232K |
| International business travelers | User2 | 4.75 | travel | ★★★☆☆ | 130K |
| In-market for luggage | User2 | 3.365 | accessories, travel | ★★★☆☆ | 67K |
| In-market for luxury goods | User6 | 2.95 | luxury, travel | ★★☆☆☆ | 32K — 252 |

USER-LIST MANAGEMENT

CROSS-REFERENCE TO RELATED APPLICATIONS

This application is a continuation application of and claims priority under 35 U.S.C. § 120 to U.S. patent application Ser. No. 15/343,898, filed on Nov. 4, 2016, which is a continuation of U.S. patent application Ser. No. 13/482,692, filed on May 29, 2012 (now U.S. Pat. No. 9,514,186), the contents of each application is incorporated herein by reference.

TECHNICAL FIELD

This document relates to presenting content.

BACKGROUND

Information used for delivery of content of interest can be collected by various entities, which can license or sell the information to content owners.

SUMMARY

In general, the subject matter described in this specification can be embodied in a method that includes identifying a user-list which is based on owned or permissioned data, wherein the user-list is associated with a corresponding owner database. The method also includes providing an application programming interface (API) configured to communicate with the owner database, and receiving, from the owner database through the API, metadata related to the user-list. The metadata at least includes data describing a category for the user-list. The method further includes storing in a searchable database a user-list identifier corresponding to the user-list and the associated metadata, and providing a user-interface that includes the user-list identifier and the corresponding associated metadata. The user-interface is configured to receive one or more management instructions related to the user-list from a user-list subscriber.

In another aspect, a system includes a data exchange engine and a storage device. The data exchange engine includes at least one processor and is configured to identify a user-list which is based on owned or permissioned data, the user-list being associated with a corresponding owner database. The data exchange engine is also configured to provide an application programming interface (API) configured to communicate with the owner database, and receive, from the owner database through the API, metadata related to the user-list. The metadata at least includes data describing a category for the user-list. The data exchange engine is also configured to provide a user-interface that includes a user-list identifier corresponding to the user-list and associated metadata. The user-interface is configured to receive one or more management instructions related to the user-list from a user-list subscriber. The storage device can be in communication with the data exchange engine and configured to store in a searchable database, the user-list identifier and the associated metadata.

In another aspect, a computer readable storage device h encoded thereon computer readable instructions, which when executed by a processor, cause a processor to perform one or more operations. The operations include identifying a user-list which is based on owned or permissioned data, wherein the user-list is associated with a corresponding owner database. The operations also include providing an application programming interface (API) configured to communicate with the owner database, and receiving, from the owner database through the API, metadata related to the user-list. The metadata at least includes data describing a category for the user-list. The operations further include storing in a searchable database a user-list identifier corresponding to the user-list and the associated metadata, and providing a user-interface that includes the user-list identifier and the corresponding associated metadata. The user-interface is configured to receive one or more management instructions related to the user-list from a user-list subscriber.

Implementations can include one or more of the following The searchable database can be different from the owner database. The API can be configured to make available to the owner database, one or more functionalities available at the searchable database. The API can be configured to facilitate management of the user-list as stored in the searchable database using an application available at the owner database. The application can allow a data-owner to manage a license of the user-list. A price of the license can be negotiated with the user-list subscriber. The metadata can further include at least one of population data describing statistical or inferred data related to the user-list or members in the user-list and subscription data including data concerning use of the user-list. The population data can include qualification data describing qualifications for members to be included in a user-list. The population data can include a number of members in the user-list. The subscription data can include cost information for subscribing to a user-list. The metadata can include demographic data. At least a portion of the metadata can be inferred from data selected from a group consisting of: web sites visited, videos viewed, types of searches conducted, determined related interest categories, determined geographical distribution, and calculated score for a probability to purchase goods or services. The storing in the searchable database can include indexing one or more of the user-list identifier and the metadata. The user-interface can be further configured to present a price of the user-list to a potential user-list subscriber. The management instructions can include an indication that a potential user-list subscriber wishes to license or subscribe to the user-list. The user-interface can be configured to present conditions for licensing or subscribing to the user-list. The user interface can be configured to present information representing a performance of the user-list. The information can include one or more of names of licensees or subscribers of the user-list, a metric indicating an effectiveness of the user-list, revenue generated using the user-list, and a number of clicks generated using the user-list.

Particular implementations of the subject matter described in this specification can be implemented so as to realize none, one, or more of the following advantages. The API allows integration of a data-owner database with a database of a hosting entity. The data-owner is able to manage data hosted by the hosting entity without having to access a user interface provided by the hosting entity. Functionalities available at the hosting entity can be made available through the API to a data-owner side application. Metadata can be shared between the data-owner database and the hosting entity database after integration of the databases performed through the API. Data-owners are able to use the hosting entity as a distribution manager to interact with potential subscribers and programmatically manage data hosted by the hosting entity. A potential subscriber can view information regarding data (including, for example, metadata) owned by a plurality of data owners through a user interface provided by the hosting entity without having to separately access user interfaces of the individual data owners.

The details of one or more embodiments are set forth in the accompanying drawings and the description below. Other features and advantages will be apparent from the description and drawings, and from the claims.

DESCRIPTION OF DRAWINGS

FIGS. 2A-21 are example user interfaces associated with the system of FIG. 1.

FIG. 3 is a flow diagram of an example process for providing a user interface to a subscriber.

FIG. 4 shows an example of a computer device and a mobile computer device that can be used to implement the techniques described here.

Like reference symbols in the various drawings indicate like elements.

DETAILED DESCRIPTION

Figure 1:
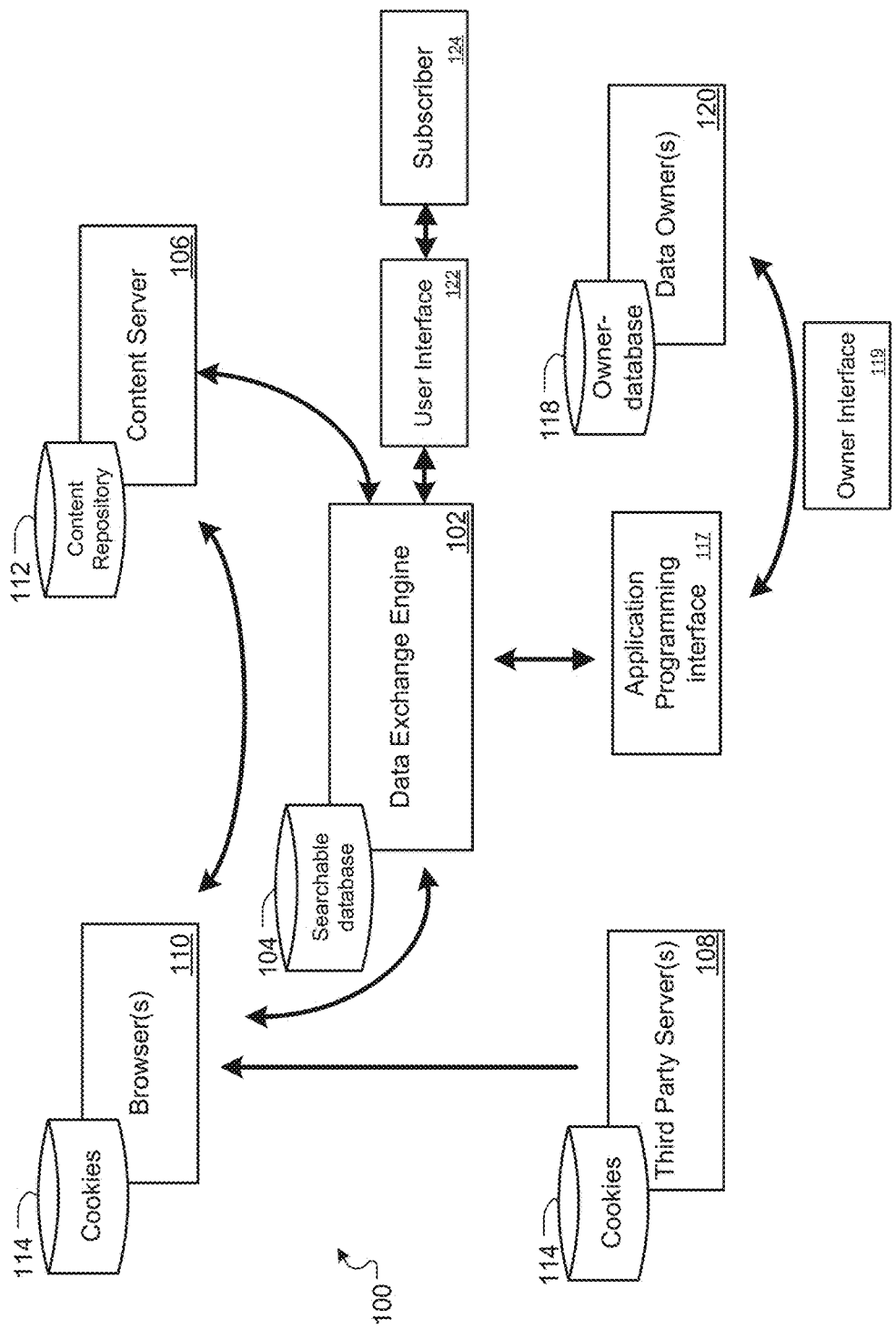
FIG. 1 is a schematic diagram of an example system for providing and using shared data.

Advertisers, publishers, and service providers generally may wish to exchange data for purposes of implementing a meaningful way of providing information and/or services (e.g., advertising content) to online users. If specific content is determined to be meaningful to a particular user, then the user may wish to access the content, purchase the content, or otherwise interact with the content. This interaction can provide revenue to the content provider (e.g., advertiser, publisher or service provider). If an entity (e.g., advertiser, publisher, or service provider) can collect data about how specific content may or may not be meaningful to users (e.g., in the form of a user-list), the collected data may be used by others in a variety of ways. Such data collection is done subject to permissions from the users and within the bounds of applicable privacy laws. For example, users can opt out of being included in the compiled user-lists. One use relates to selecting content of interest. Other uses are possible, such as in adjusting bids in an auction based system, for example, on user-lists that indicate specific content is of interest to one or more users. In general, an entity that complies or creates the user-lists, or collects data pertaining to the user-lists, can be referred to as a data owner. In a data exchange system, there can be many (e.g. hundreds) of data owners that create or compile various types and forms of user-lists. User-lists can be published, sold, licensed or otherwise accessed to assist in providing personalized content to the specific users and increasing revenue for a content provider.

The data owners can provide access to their user-lists through their respective user interfaces. However, for an existing or potential subscriber that deals with a large number of user-lists from various data owners, accessing individual data owners' interfaces could be challenging. In such cases, it may be advantageous to host the user-lists from various data owners at a central entity that various data owners as well as subscribers can access. The methods and systems described herein can allow data owners to integrate their respective databases with a centralized database through an application programming interface (API). Subscribers can then access the user lists from various data owners through a user interface provided by the centralized database. This allows the subscribers to browse available user-lists without having to access user interfaces provided directly from the individual data owners.

In some implementations, user-lists can represent specific user information pertaining to predefined categories. The categories can be defined by the data owners. For example, a user-list may include data about one or more users which characterizes the users to a category (e.g., homeowner, craftsman, DVD renter, etc.) to allow delivery of contentment of interest to the users by, for example, publishers or advertisers. In some implementations, the user-lists can be used to deliver relevant content of interest.

User-lists can be generated and exchanged according to a number of rules, and those rules can be used to market particular user-lists to specific consumers. The rules can employ methods of assigning users to particular user-lists. Such rules can provide a logical categorization of data, information, or services for the purposes of determining which data content in the user-lists is particularly relevant to a number of users. The application programming interface described herein can allow data owners to programmatically manage (for example, through rule based manipulations) data stored or hosted in the centralized database.

FIG. 1 is a schematic diagram of a system 100 for providing and using shared data. The shared data can, for example, include user-lists detailing a number of predefined categories pertaining to specific users. The categories can be defined by or relate to user information including, but not limited to, browser history, user selections, cookie information, user-provided preferences, purchase histories, web search data, or other data (e.g., in accordance with applicable privacy policies and where the user has provided permission for the storing and/or collecting of such data). In some implementations, a user-list is owned by a data owner 120 that gathered the information in the user-list. The user-lists owned by the data owner 120 can be stored, for example, in an owner database 118. In some implementations, a data owner 120 can provide user-lists stored in the owner database 118 to a central entity such as a data exchange engine 102 such that the user-lists can be shared with other entities, such as advertisers, third-party service providers, or third-party advertisers, data aggregators, and other online users. The user-lists provided to the data exchange engine 102 can be stored in a centralized searchable database 104 that the data exchange engine 102 is configured to access.

The user-lists can be provided to the data exchange engine 102 and maintained by the data exchange and/or by the data owners 120. User-lists can be updated as appropriate to either refine the category/categories associated therewith or the users that are members of a given list. A category for a particular user list can be specified, for example, in metadata associated with or related to the particular user-list. In some implementations, the data exchange engine 102 can be configured to provide an application programming interface (API) 117 that allows one or more software components from a data owner's side to communicate with one or more software component of the data exchange engine 102. In some implementations, the API 117 can be a software specification that includes one or more of functions, routines, subroutines, data structures, object classes, and variables. The API 117 can be tangibly embodied on a computer readable storage device. The API 117 can be implemented in accordance with a standard (e.g. using Portable Operating System Interface or POSIX), using vendor specific APIs or using libraries available in a programming language (e.g., using Java APIs). In some implementations, the API 117 can be implemented as independent of the programming language such that it can be invoked from various computing environments.

In some implementations, the API 117 can be configured to integrate a data platform of the data owner 120 with a data platform of the data exchange engine 102. Integration of the data platforms from the two sides can include, for example, integration of an owner database 118 with the searchable database 104 associated with the data exchange engine 102. Such integration can allow a data owner 120 to move data (e.g. user-lists) stored in the owner database to the searchable database 104 while retaining the capability to manage the data through applications used to manage the owner database 118.

The API 117 can also be configured to provide functionalities available at the data exchange engine 102 to owner-side applications such as the applications used to manage the owner database 118. For example, while the database management system (DBMS) for the owner database 118 and the searchable database 104 may differ from one another, the API 117 can allow a data owner 120 to manage user-lists stored in the searchable database 104 using the DBMS for the owner database 118. The term DBMS as used herein refers to computer programs that can be used to control creation, use, and/or maintenance of a database.

In some implementations, the API 117 can allow sharing of metadata between the owner database 118 and the searchable database 104. The metadata corresponding to a particular user-list can include any appropriate information related to the user-list such as a human readable name, category, timestamp, source, expiration date, and size. In some implementations, the API 117 allows a data owner 120 to enter, edit, delete or otherwise mange metadata related to user-lists stored in the searchable database 104.

In general, the metadata can include various parameters and attributes related to the user-list and can increase a meaningfulness of the user-list to a potential or current subscriber. For example, the metadata can include data describing one or more categories for a user-list, population data describing statistical or inferred data concerning a list or members in a given user-list, and subscription data including data concerning use of a given user-list. Metadata can be associated with a user-list, for example, by a data owner. In some implementations, metadata can be associated with a user-list by a non-owner of the user-list.

The data describing a category for a user-list can be, for example, a category name, such as "travel", "luxury goods", or "sports". A given user-list can have multiple associated categories. For example, a given user-list can have associated categories of "luxury" and "automobile."

Population data can include, for example, statistical or inferred data concerning a user-list. For example, population data can include a date of creation of the user-list. As another example, population data can include data concerning one or more ratings or reviews for a user-list. For example, an average review score or a popularity rating can be associated with a user-list. As another example, user review comments can be associated with a user-list.

Population data can also include information describing a schema or format of the user-list data. For example, population data can include information indicating a number of fields included in the user-list data and a data type for the fields. For fields of an enumerated type, population data can include indications of possible values allowed for the field. For fields of a numerical data type, population data can include minimum and maximum values allowed for the field.

Population data can also include statistical or inferred data concerning members in a given user-list. For example, population data for a given user-list can include a count of the number of members in the user-list, data indicating a time of updates to the user-list (e.g., date of last member addition, date of last member deletion), and other statistics regarding data concerning members in the user-list. For example, for an enumerated field included in user-list data, population data can include one or more statistics which indicate a distribution of values across user-list members for the field. For a numerical field included in user-list data, population data can include statistics such as minimum and maximum stored values, a mean value, or a median value. In some implementations, population data can also include one or more statistics indicating likely page views for a given member of a user-list on a given slice of inventory.

Population data can include qualification data describing qualifications for members to be included in a user-list. For example, qualification data can include a number of page views required by a member to qualify for membership in a user-list. As another example, qualification data can include criteria indicating a set of sites to be visited by a member or one or more types of sites to be visited by a member for a member to qualify for inclusion in a user-list. As yet another example, qualification data can include one or more search keywords to be entered by a member for a member to qualify for inclusion in a user-list. Qualification data can also indicate criteria for a member to be excluded, or "dropped" from a user-list. For example, a criterion can specify that a member is removed from a given user-list if they do not enter any search keywords associated with the user-list during a given time period (e.g., two weeks).

In some implementations, metadata for a user-list can include, in addition to population data, subscription data including data concerning use of a given user-list. For example, subscription data can include cost information for subscribing to a user-list. In some implementations, cost information can be described in terms of a cost per one thousand impressions (CPM). That is, cost information can indicate a cost for using a user-list to generate one thousand impressions.

Subscription data can also include restrictions on use of the user-list. For example, a data owner 120 can indicate that user-list data for a given user-list may not be combined with other data, or that the user-list data may not be combined with certain types of other data (e.g., competitor data, or data having a particular subject matter or of a particular category). A data owner 120 can specify that user-list data is applicable to or restricted to use associated with a particular geographic region. Subscription data can indicate whether use restrictions are negotiable or non-negotiable.

Subscription data can also include descriptions of best practices for use of a user-list. For example, subscription data can include descriptions of particular uses of user-list data that have been demonstrated, through testing, to be effective. As a more particular example, subscription data can include descriptions of other types of data that have been effective when combined with given user-list data.

In some implementations, metadata associated with a user-list can include data developed by a non-owner of the user-list. For example, the developed data can include data relating to cross correlations between members included in the user-list. For example, the data exchange engine 102 can develop correlations by analyzing data known by the data exchange engine 102 about members in a given user-list owned by a data owner 120. The data exchange engine 102 can perform analysis if given permission by the data owner 120.

Developed data can also include data relating to inferences about members included in a user-list. For example, in some implementations, the data exchange engine 102 can infer data about members included in a user-list, such as demographic data (e.g., geographical distribution), data about sites visited, data indicating videos viewed by members in a user-list, types of searches conducted by members in the user-list, determined related interest categories of members in the user-list, and other data or statistics about members in a user-list, such as calculated scores indicating a probability that a given member is interested in purchasing goods or services.

Figure 2A:
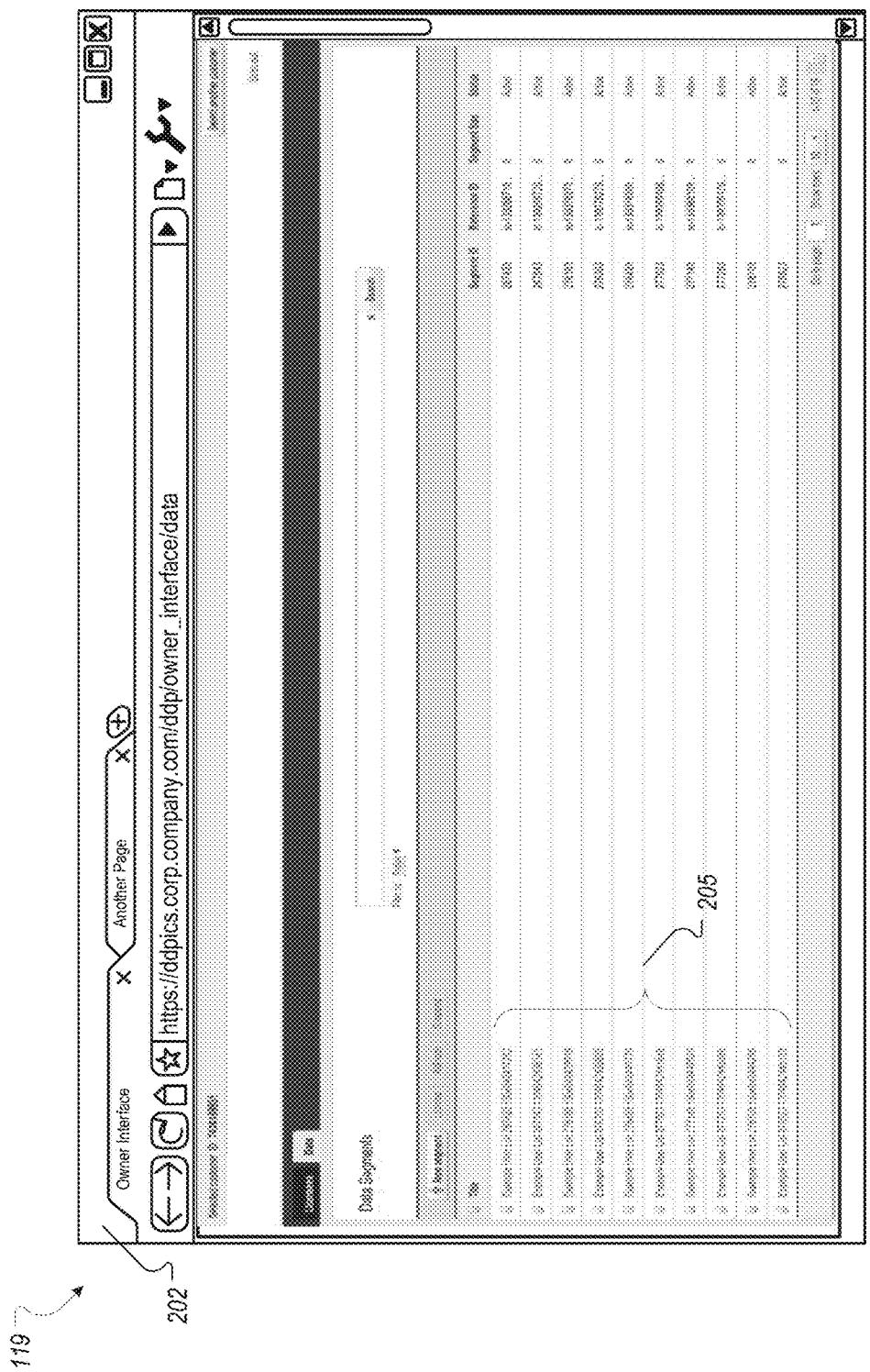

In some implementations, the data owners 120 can interact with the API 117 through an owner interface 119. In some implementations, the owner interface 119 can be configured to accept user-list management instructions from the data owner 120 and pass on the instructions to the data exchange engine through the application programming interface. An example of such an owner interface 119 is shown in FIG. 2A. Even though in the example of FIG. 2A the owner interface 119 is rendered in a browser 202, the owner interface 119 can also be provided as a stand-alone application (e.g., as an application for a smartphone). The owner interface 119 allows a data owner 120 to manage one or more user-lists 205 owned by the data owner. The data owner 120 can add, delete, edit, license, activate, suspend or otherwise manage the user-lists 205 through the owner interface 119.

Figure 2B:
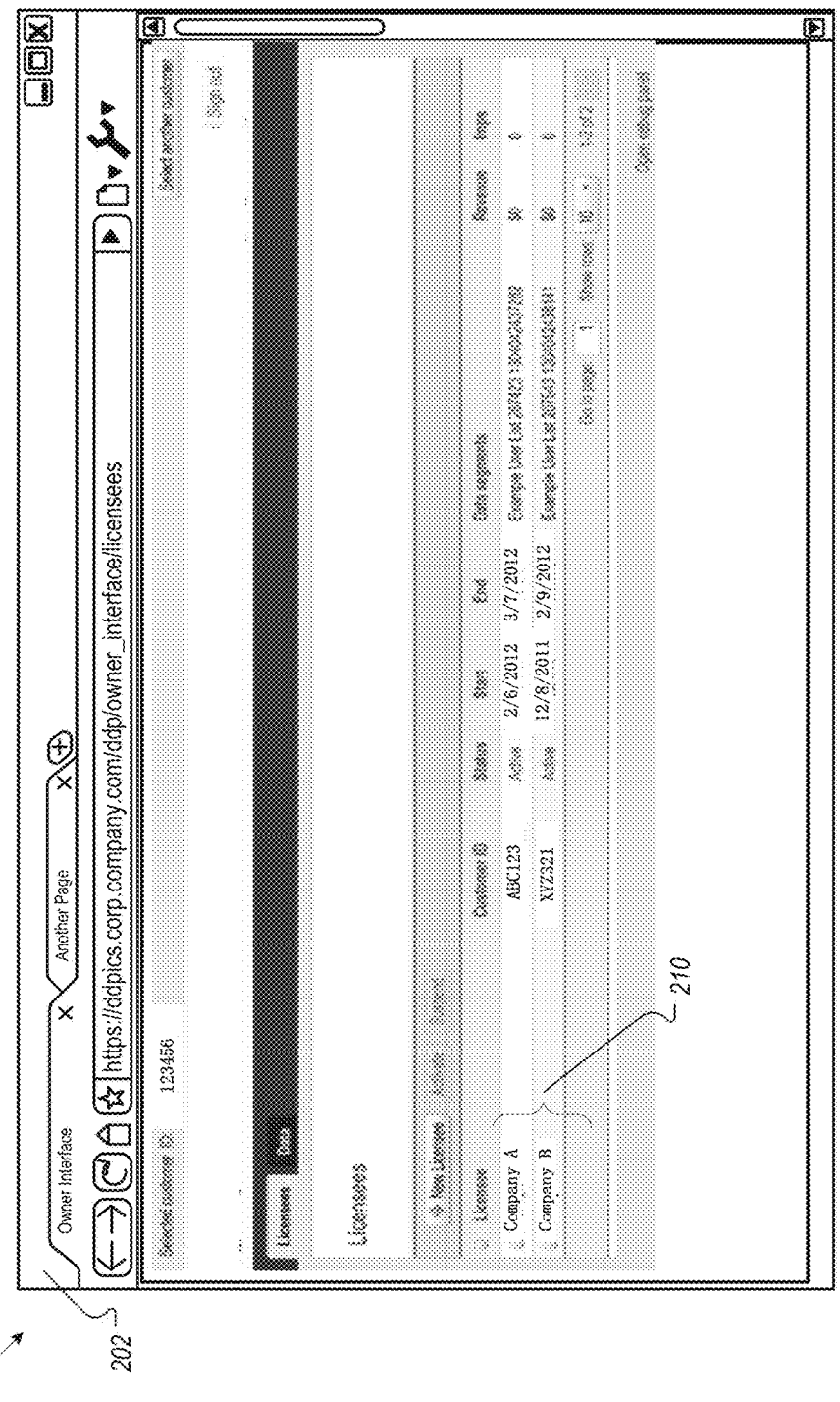

In some implementations, the owner interface 119 can also be configured to allow the data owner 120 to manage licensees or subscribers 210 of one or more user-lists (also referred to as "segments," "data segments," or "audience segments") owned by the data owner 120. This is illustrated as an example in FIG. 2B. The owner interface 119 can be configured to receive licensee management instructions from the data owner 120 and pass on the instructions to the data exchange engine 102. The licensee management instructions can include, for example, adding, suspending, reinstating, activating or deleting a licensee or a user list licensed by or subscribed to by the licensee.

Referring again to FIG. 1, in some implementations, the data exchange engine 102 can be configured to provide a user interface 122 for subscribers 124 (e.g., advertisers) and others to browse, review and/or license user-lists available in the searchable database 104. FIG. 2C shows an example user interface 250 for a marketplace for presenting user-lists to potential or existing subscribers 124. The presented user-lists can include, for example, the lists that are available in the searchable database 104, lists that satisfy one or more search criteria, or lists that correspond to some other filter criteria. The data owners and the potential subscribers can be anonymized from one another in the user interfaces.

The user interface 122 can include an available user-lists area 252 for presenting information about user-lists to which potential subscribers can subscribe. In some implementations, the user-lists area can display metadata related to the available user-lists. This can include, for example, a user-list name 254, a provider 256 (e.g., a data owner 120), a subscription cost 258 (e.g., in terms of CPM), one or more categories 260, an average review 262, and a user count 264. For example, an available user-list 166 has a name of "Adventure travel in-market", is provided by a data owner named "User5", has a cost of 2.25 CPM, is included in the category "travel", has an average review of four out of five "stars", and has one hundred fifty four thousand users.

The user interface 122 can include a filters area 270 which a subscriber 124 can use to filter the user-lists displayed in the user interface 122 to show user-lists matching one or more criteria. For example, criteria 272 specifies to show user-lists for which a category includes "travel" and for which a subscription cost is less than or equal to five dollars per one thousand impressions. The subscriber can edit the criteria 272 or define new criteria by selecting a control 274 to display a filters interface. In some implementations, one or more "quick filters" may be displayed based on characteristics of a subscriber's currently subscribed-to user-lists or other historical data (e.g., based on prior use, popularity or prior viewing history). For example, a quick-filter 276 may be selected to display available user-lists that are comparable to one or more of a subscriber's currently subscribed-to user-lists but at a lower subscription cost. In some implementations, the user interface 122 can also include a search interface for searching specific user-lists.

In some implementations, the user interface 122 can include one or more recommendations. In the example of FIG. 2C, a recommendation 280 for a user-list 282 named "International business travelers" is displayed. The recommendation 280 can display a rating for the user-list 282 (e.g., four out of five stars), a subscription cost for the user-list 282 (e.g., $4.75 CPM), and the provider of the user-list 282 (e.g., "User5"). The recommendation 280 can also indicate that the user-list 282 is based on a "business travelers" user-list with a subscription cost of $5.15 CPM provided by "User6". The recommendation 280 can include a control 284 which can be selected to subscribe to the user-list 282. A control 285 can be selected to dismiss the recommendation 280. Further, another recommendation 286 for a user-list 288 indicates that the user-list 288 is not yet rated, has a subscription cost of $2.5 CPM, is provided by "User7", was added this month, and is based on the category of "travel". A control 290 can be selected to subscribe to the user-list 288.

In some implementations, when a potential subscriber 124 indicates intent to buy or subscribe to a particular segment or user-list, (for example, by selecting the control 284 or 290) the potential subscriber 124 can be presented with an appropriate control or interface to bid on the particular segment. The offer or bid from the potential subscriber can be passed back to the data exchange engine 102 and provided to the corresponding data owner 120 (for example, using the owner interface 119) through the API 117. The API 117 can be further configured to receive from the data owner 120 (possibly through the owner interface 119) an indication of whether the offer or bid is acceptable by the data owner 120. In some implementations, the API 117 can also be configured to receive a counter-offer from the data owner 120. The acceptance, rejection, or counter offer from the data owner can be conveyed to the data exchange engine 102 and eventually presented to the potential subscriber 124, for example, through the user interface 122. The API 117 can therefore facilitate a negotiation between a potential subscriber 124 and a data owner 120.

In some implementations, a plurality of APIs can be used in place of a single API 117. For example, a first API can be used to integrate metadata information between the owner database 118 and the searchable database 104 whereas a second API can be used for implementing the negotiation functionalities between subscribers and data owners. Additional APIs can be used for implementing other functionalities without departing from the scope of this disclosure.

Figure 2D:
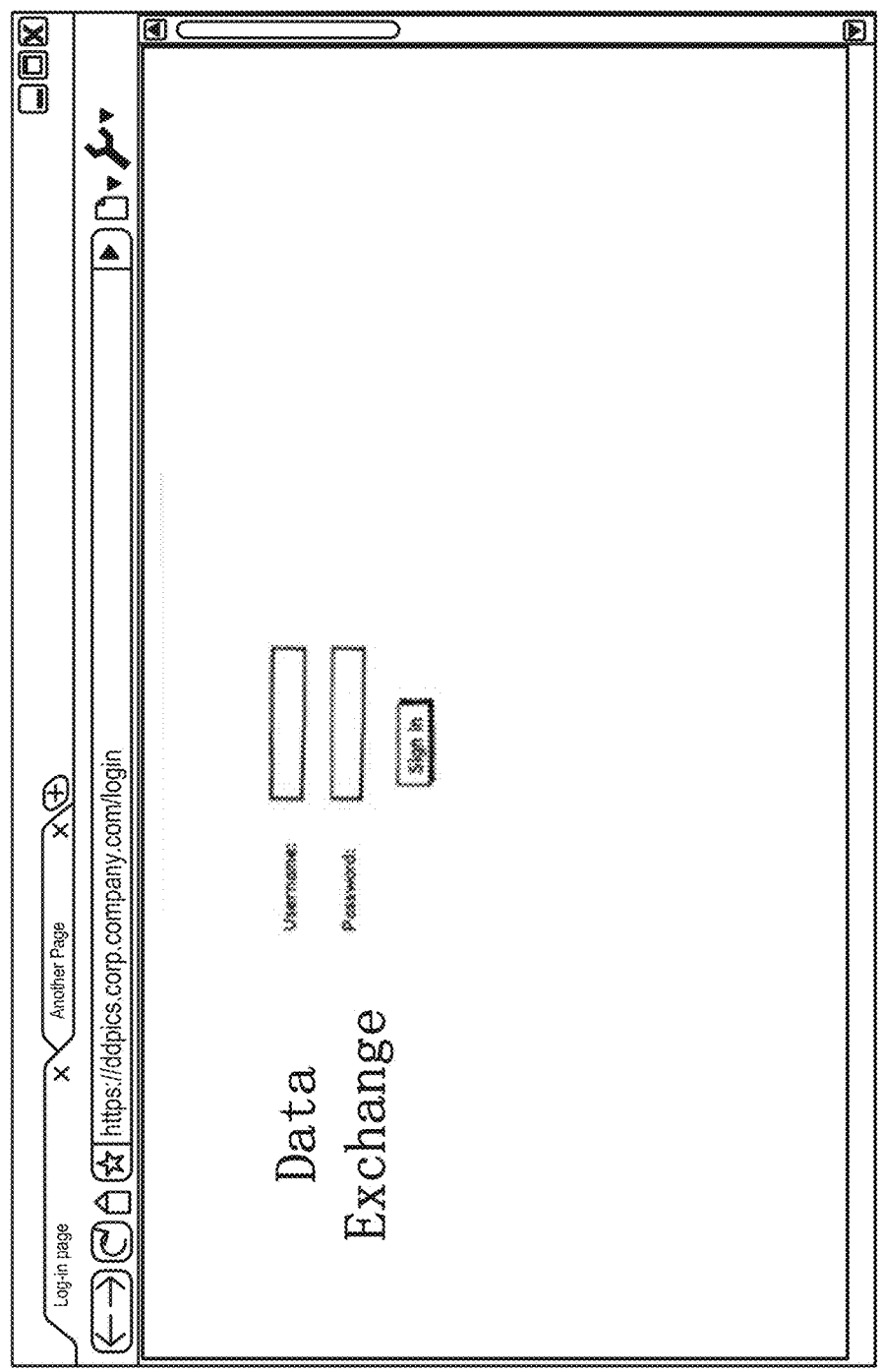
Figure 2E:
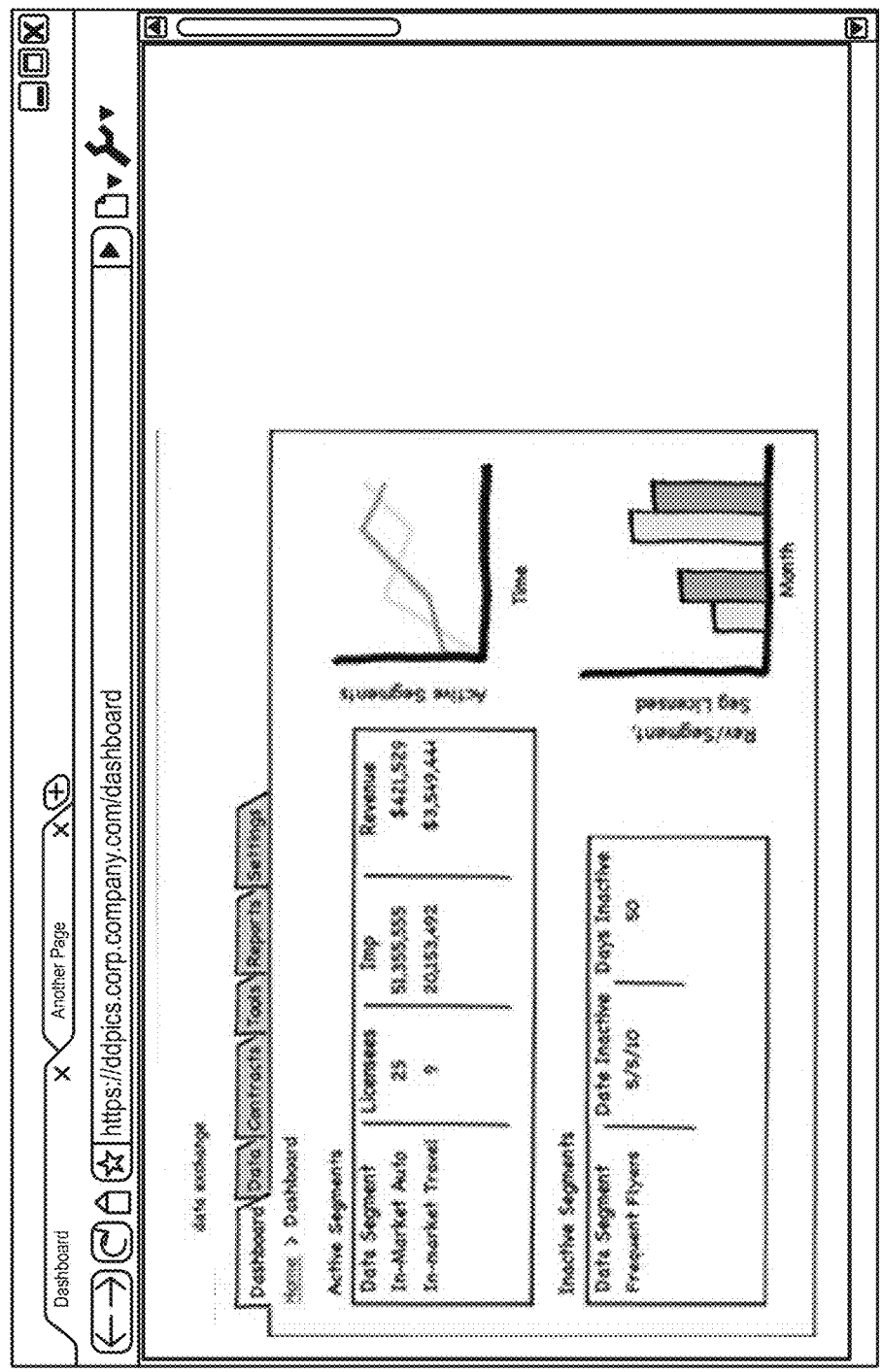
Figure 2F:
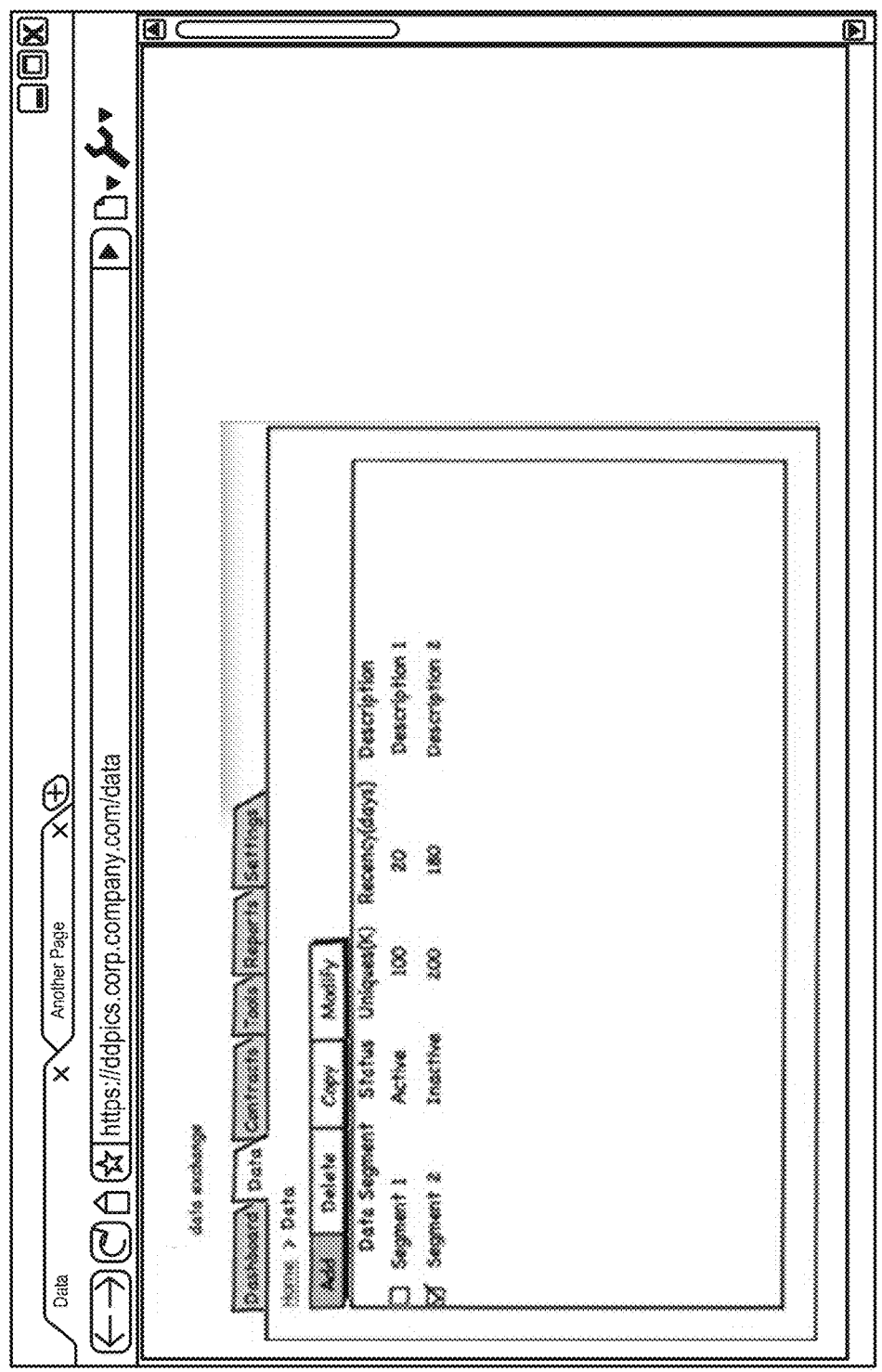
Figure 2G:
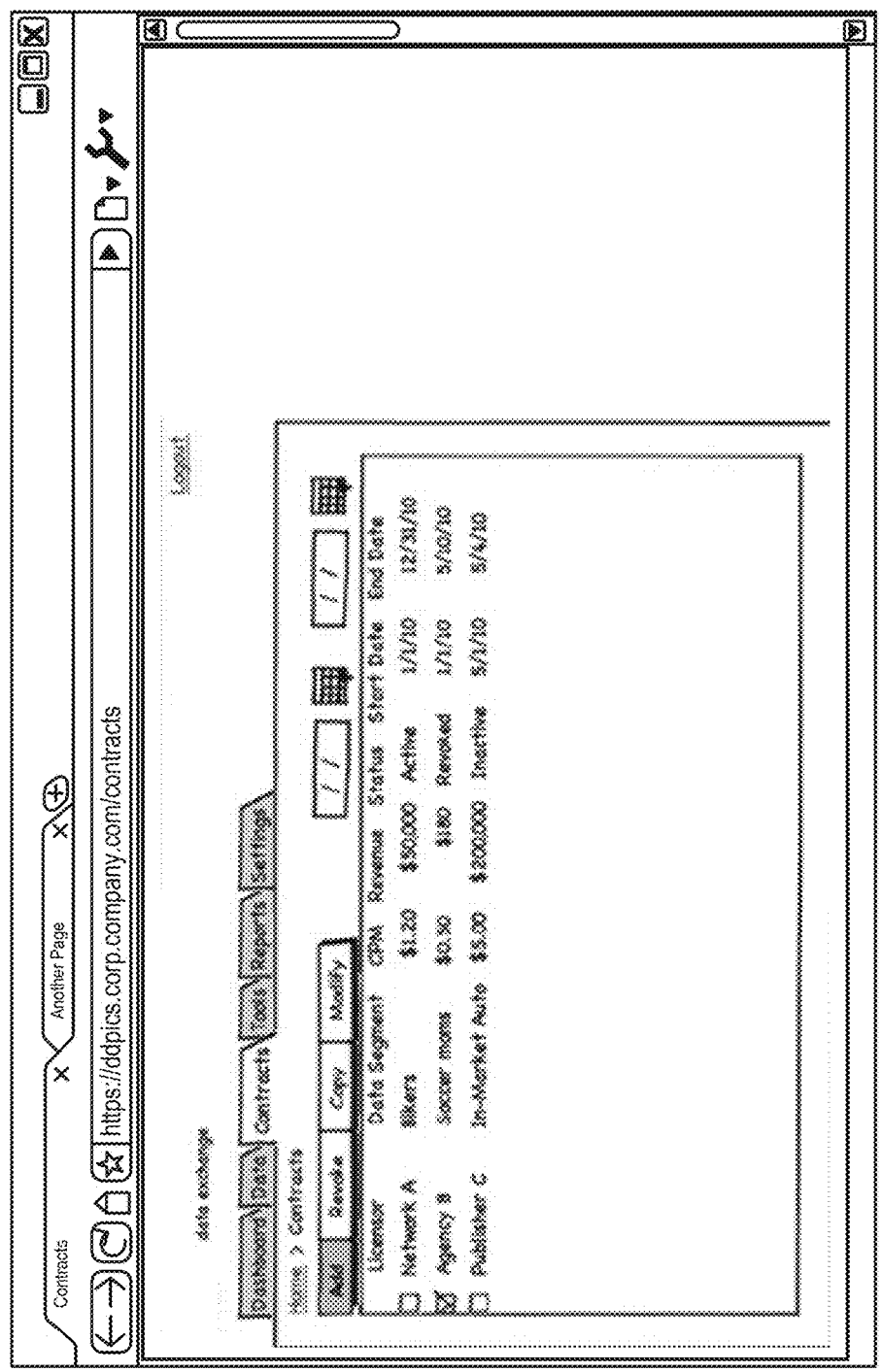
Figure 2H:
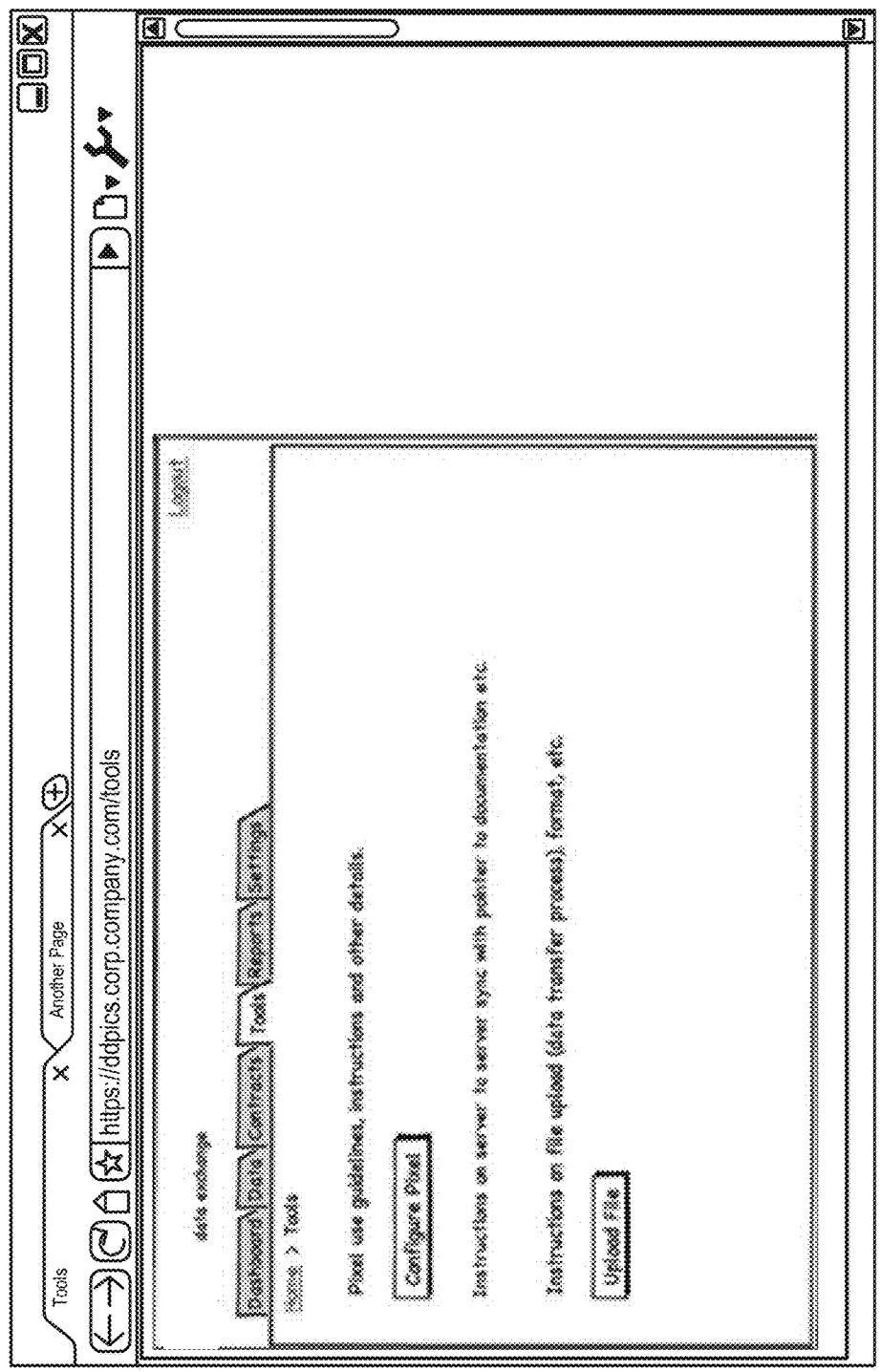
Figure 21:
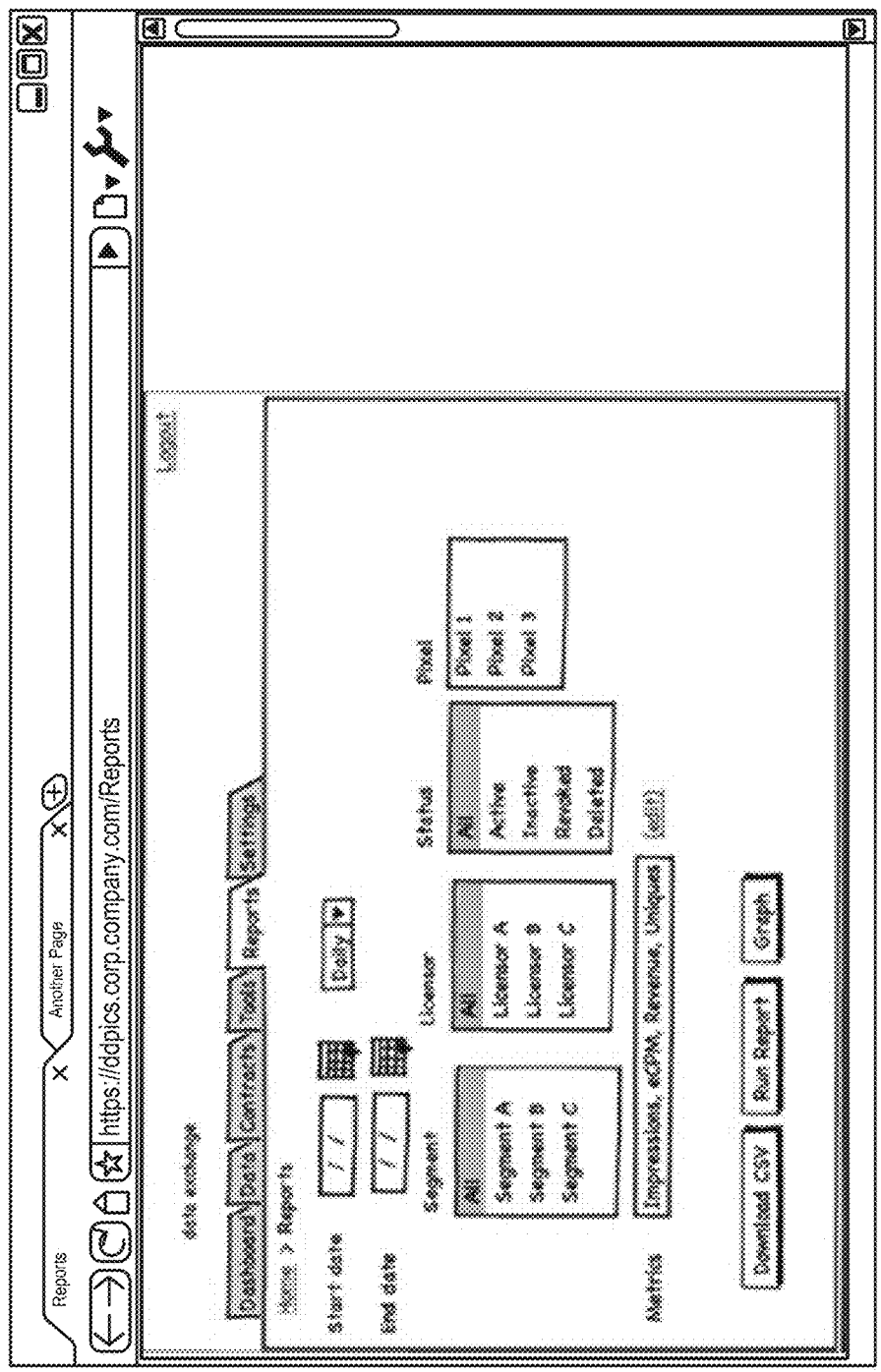

FIGS. 2D-2I show examples of additional parts of the user interface 122 for managing user-list subscriptions. FIG. 2D shows a login page for accessing user-lists associated with a subscriber account. FIG. 2E shows an example user interface that includes active and inactive segments or user-lists associated with a subscriber account. FIG. 2F shows an example of a user interface for managing segments. FIG. 2G shows an example of a user interface showing contract details for subscriptions including the licensor or data owner from which the subscription has been licensed. FIG. 2H shows an example of a user interface showing tools available for managing a subscription. FIG. 2I shows an example of a user interface for reports associated with a subscription account. The data exchange engine 102 can be configurable to maintain, update, present, license, sell or otherwise manage one or more user-lists based on owned or permissioned data. The generated user-lists can include user-specific associations characterizing specific online user behavior. The associations can be used, for example, to provide personalized content (e.g., ads) from a content server 106, a third-party server 108, or other content provider. The data exchange engine 102 as described here may parallel the functionality of an online advertisement exchange system for delivering content of interest by online advertisers, for example.

In some implementations, the data exchange engine 102 can create an exchange between owners of permissioned data and users of such data. Users of the permissioned data can include sponsored content providers (e.g., advertisers) that seek to deliver content of interest to particular categories of users. In some implementations, the data exchange engine 102 provides a mechanism for a provider of advertising placement services in interest-based online advertising to make available additional third-party data sources to buyers of advertising space. In some implementations, the data exchange engine 102 can provide user-lists to publishers, syndicates, and other data providers for various purposes, including interest-based delivery of sponsored content to users.

The content server 106 can provide sponsored content (e.g., ads) or other content to any number of browsers 110 via the data exchange engine 102 or directly. In addition, the content server 106 can be configurable for receiving content requests and providing content to requesting users. In operation, the content server 106 can select sponsored content based on one or more criteria and in view of data that is included in one or more user-lists. The content server 106 can also provide access to other storage elements, such as repositories, in the example shown as content repository 112. The content repository 112 can be used to store content, for example, advertising content associated with particular keywords, bidding criteria, advertisers, and criteria for delivering content of interest. Data storage elements may include any one or combination of methods for storing data, including without limitation, arrays, hash tables, lists, and pairs. The content server 106 can access other similar types of data storage devices, such as the searchable database 104, for example.

In some implementations, subscribers (e.g. advertisers) can work with data owners to subscribe to, purchase or license user-lists for purposes of delivering content of interest (e.g., based on demographic categories, interest categories, or preference categories). The user-lists can be analyzed for quality and other considerations. The subscribers can use the user-lists for determining criteria for delivering content of interest or to modify current bids, for example. In one example use case, an advertiser can subscribe for a period of time to a user-list. The user-list itself may be defined as being associated with a certain category (e.g., Internet shoppers interested in buying a sports car) of users. Requests for advertisements can be received by the advertising system, and the data exchange can be used to determine for a given user to which user-lists the user is subscribed. In a real-time bid example, the advertisers that have subscribed to the user-lists may be presented with the request and information on users satisfying the category or categories associated with the user-lists, allowing the advertisers to adjust/submit bids in consideration of such information.

In some implementations, the third-party servers 108 can provide third-party services to any number of browsers 110 via the data exchange engine 102. For example, the third-party servers 108 can provide web services, advertising services, or external APIs (application programming interfaces) to connect to a third-party server. The third-party servers 108 can include, for example, one or more servers executing a search engine application program. In some implementations, the third-party servers 108 can include a related information server or a content server. In some implementations, the third-party servers 108 can gather information related to user activity using, for example, cookies 114.

The browser 110 represents a user browsing the Internet and can be substantially similar to the browser 202 described above. The browser 110 can access any website available on a network belonging to a person, or any other type of entity such as a company, enterprise, etc. For example, in FIG. 1 browser 110 can access a service or website. The service or website can be hosted by the third-party server 108, or alternatively by another server associated with system 100. A user can employ the browser 110 to search the Internet for services, information, or merchandise. In some implementations, the browser 110 can gather information related to user activity using the cookies 114.

In some implementations, the content server 106 can be configured to customize advertising content according to one or more user-lists. In particular, the content server can be configured to customize the display criteria, language, or other content of an advertisement according to user-list information. For example, if a particular user-list includes user-entered searching pertaining to purchasing a vehicle, the content server 106 can use the user-entered searching information (e.g., a cookie 114 stored from performing a web search in a browser) to customize the display or content of content such as an advertisement. The customization can, for example, provide the user with a more relevant content.

In some implementations, the browser 110 can make a request for advertising content from the content server 106 or the third-party server 108. The data exchange engine 102 can retrieve a list of user-lists from the table-based repository associated with a received request and append or otherwise associate the list of user-lists to the request. Any subsequent processing of the request can use the list, for example, for delivering content of interest, advertising customization and bid generation. The list of user-lists or portions of the list can also be transmitted to a real-time bidder to provide the bidder with pertinent information about one or more users.

Figure 3:
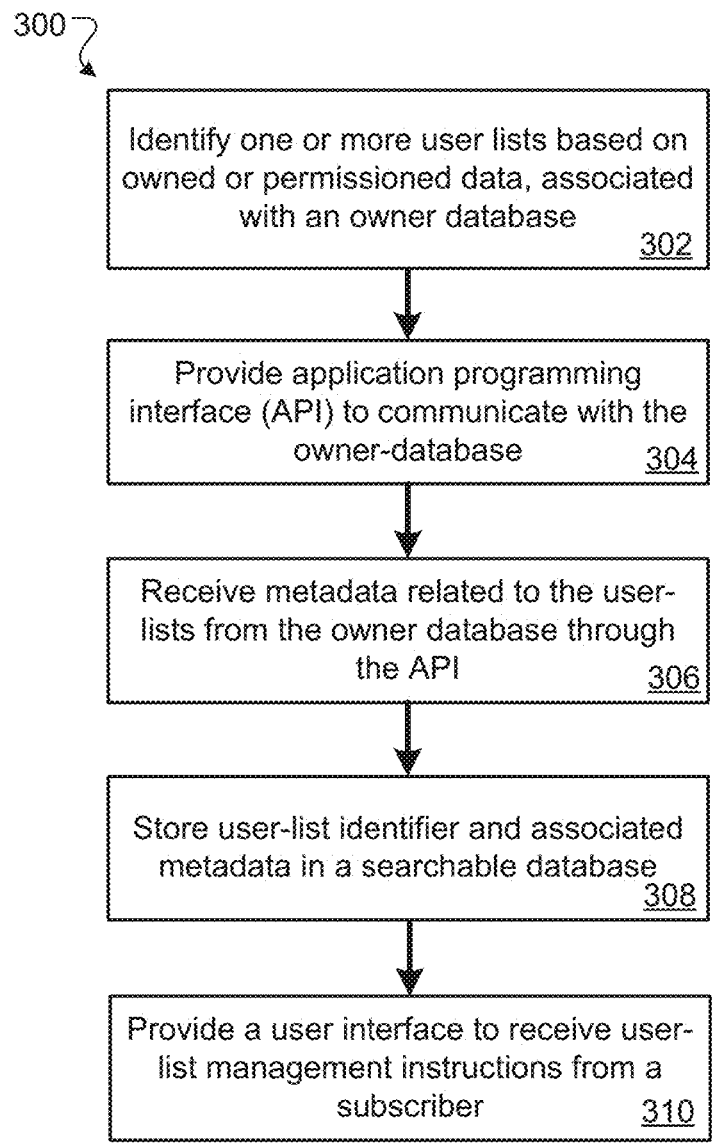

FIG. 3 is a flow diagram of an example process 300 for presenting a user-list-related interface to subscribers. The interface can be presented to existing as well as potential subscribers. The process 300 may be executed, for example, by the data exchange engine 102 shown in FIG. 1.

A user-list can be identified (302) based on owned or permissioned data. The identified user-list can be associated with an owner database such as the database 118 described with reference to FIG. 1. The user-list associated with the owner database can be formatted in accordance with a first data platform (e.g. an owner-side data structure that is used to store data in the owner database 118). In some implementations, the user-list can be provided by a data owner 120 to the data exchange engine 102. In some implementations, the user-list can be generated by the data exchange engine 102, for example, from data provided by the data owner 120. The user-list can be identified, for example, using a user-list identifier associated with the user-list. Such a user-list identifier can be determined, for example, by the data owner 120, or, for example, by another entity, such as the data exchange engine 102.

An API can be provided to communicate with the owner database (304). The API can be provided, for example, by an entity such as the data exchange engine 102. In some implementations, the API can be substantially similar to the API 117 described above with reference to FIG. 1. Providing the API can also include providing an owner interface (e.g. the owner interface 119 of FIG. 1) to allow the data owner to manage and/or edit the user-list. In some implementations, the API can be configured to integrate the first data platform with a second data platform associated the data exchange engine 102. For example, the API can allow sharing of metadata between the first and second data platforms.

Metadata related to the user-list can be received (306) from the owner database through the API. The metadata can include, for example, data describing a category for the user-list. In some implementations, the metadata can include various parameters and attributes related to the user-list as described above with reference to FIG. 1.

A user-list identifier identifying the user-list and the associated metadata is stored in a searchable database (308). Storing can include indexing the metadata for ease of retrieval based on received queries. Storing can be performed, for example, by the data exchange engine 102. The user-list identifier and the associated metadata can be stored, for example, in the searchable database 104 described with reference to FIG. 1

A user interface can be provided (310) to subscribers of the user-list. The user interface can be substantially similar to the user interface 122 described above with reference to FIG. 1 and can be presented to both potential as well as existing subscribers. In some implementations, the user interface can be used to publish available user-lists from one or more data owners. For example, the user interfaces illustrated in FIG. 2C-21 can be presented to subscribers. The user interface can be configured to receive one or more management instructions related to the user-list from a subscriber. For example, a potential subscriber can buy a particular user list using the interface. In another example, an existing subscriber can manage licensed or bought user-lists through the user-interface. This can include, for example, reviewing performance reports related to user-lists, applying one or more rules related to the user-lists to deliver content of interest, and negotiating (or renegotiating) the price of a particular user-list with the corresponding data owner.

Figure 4:
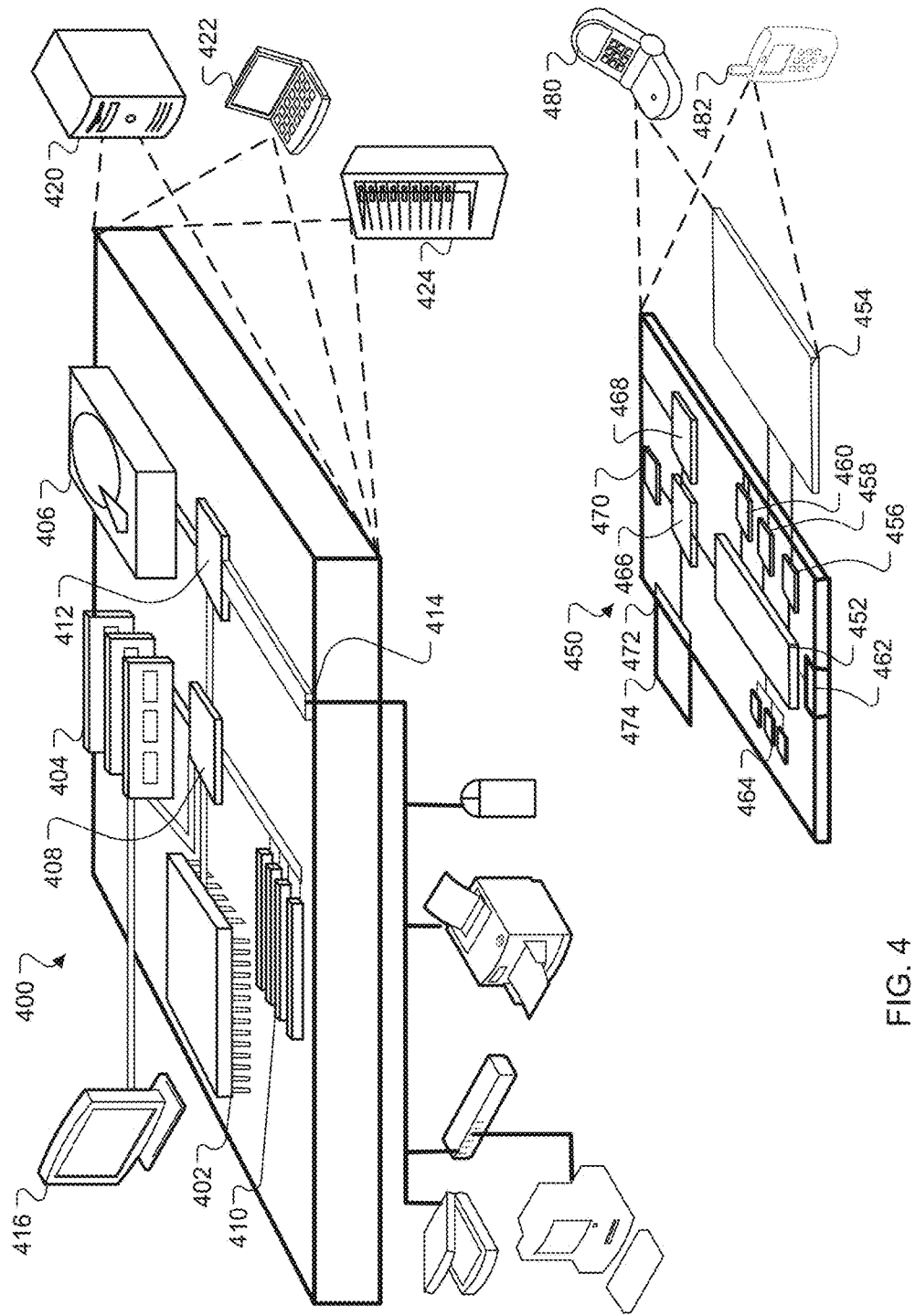

FIG. 4 shows an example of a generic computer device 400 and a generic mobile computer device 450, which may be used with the techniques described here. For example, the computing device 400 or 450 can be used to implement at least a portion of a data exchange engine 102 or other entities described above with reference to FIG. 1. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing at least a portion of the operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Such devices can include one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. The components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A system comprising:
   an application programming interface sub-system that enables, from within a first database, search and retrieval of user-lists stored in second databases that each differ from the first database and that are each provided by sources that are each different from a source of the first database, with the application programming interface sub-system enabling the search and retrieval by assigning a user-list identifier to each of the user-lists and indexing user-list identifiers in the first database;
   a data exchange engine comprising one or more processing devices; and
   one or more non-transitory machine-readable storage media storing instructions that are executable by the data exchange engine to perform operations comprising:
      identifying a plurality of user-lists, wherein a first user-list in the plurality of user-lists is associated with a first one of the second databases provided by a first source of the sources, and a second user-list in the plurality of user-lists is associated with a second one of the second databases that is provided by a second source of the sources, the second source being different from the first source;
      searching an index in the first database for a user-list identifier assigned to one of the plurality of user-lists and indexed by the application programming interface sub-system; and
      providing, at least partially based on the searching, data for a user interface that displays the user-list identifier corresponding to the one of the plurality of user-lists and metadata received from the first one of the second databases and the second one of the second databases and that receives one or more instructions related to one or more of the plurality of user-lists from the first one of the second databases and the second one of the second databases.

2. The system of claim 1, wherein the metadata comprises at least one of i) population data describing statistical or inferred data related to a user-list of the plurality of user-lists or one or more members in the user-list, ii) subscription data comprising data concerning use of the user-list, or iii) a category for the user-list.

3. The system of claim 2, wherein the population data comprises qualification data representing one or more qualifications for one or more respective members included in the user-list.

4. The system of claim 2, wherein the population data comprises a number of the members in the user-list.

5. The system of claim 2, wherein the subscription data comprises cost information for subscribing to the user-list.

6. The system of claim 1, wherein the metadata comprises demographic data.

7. The system of claim 1, wherein at least a portion of the metadata is at least partly inferred from one or more web sites visited, one or more videos viewed, one or more types of searches conducted, one or more interest categories, a determined geographical distribution, or a calculated score for a probability to purchase one or more goods or one or more services.

8. The system of claim 1, wherein the one or more instructions include an indication that a potential user-list subscriber requests to license or subscribe to the one or more of the plurality of user-lists.

9. The system of claim 1, wherein the user interface is configured to present conditions for licensing or subscribing to a user-list.

10. The system of claim 1, wherein the user interface is configured to present information representing a performance of a user-list.

11. The system of claim 10, wherein the presented information represents one or more names of one or more licensees or one or more subscribers of the user-list, a metric indicating an effectiveness of the user-list, revenue generated using the user-list, and a number of clicks generated using the user-list.

12. A method comprising:
   enabling, by an application programming interface sub-system, from within a first database, search and retrieval of user-lists stored in second databases that each differ from the first database and that are each provided by sources that are each different from a source of the first database, with the application programming interface sub-system enabling the search and retrieval by assigning a user-list identifier to each of the user-lists and indexing user-list identifiers in the first database;
   identifying a plurality of user-lists, wherein a first user-list in the plurality of user-lists is associated with a first one of the second databases provided by a first source of the sources, and a second user-list in the plurality of user-lists is associated with a second one of the second databases that is provided by a second source of the sources, the second source being different from the first source;

searching an index in the first database for a user-list identifier assigned to one of the plurality of user-lists and indexed by the application programming interface sub-system; and providing, at least partially based on the searching, data for a user interface that displays the user-list identifier corresponding to the one of the plurality of user-lists and metadata received from the first one of the second databases and the second one of the second databases and that receives one or more instructions related to one or more of the plurality of user-lists from the first one of the second databases and the second one of the second databases.

13. The method of claim 12, wherein the metadata comprises at least one of i) population data describing statistical or inferred data related to a user-list of the plurality of user-lists or one or more members in the user-list, ii) subscription data comprising data concerning use of the user-list, or iii) a category for the user-list.

14. The method of claim 12, wherein at least a portion of the metadata is at least partly inferred from one or more web sites visited, one or more videos viewed, one or more types of searches conducted, one or more interest categories, a determined geographical distribution, or a calculated score for a probability to purchase one or more goods or one or more services.

15. The method of claim 12, wherein the one or more instructions include an indication that a potential user-list subscriber requests to license or subscribe to the one or more of the plurality of user-lists.

16. The method of claim 12, wherein the user interface is configured to present conditions for licensing or subscribing to a user-list.

17. The method of claim 12, wherein the user interface is configured to present information representing a performance of a user-list.

18. The method of claim 17, wherein the presented information represents one or more names of one or more licensees or one or more subscribers of the user-list, a metric indicating an effectiveness of the user-list, revenue generated using the user-list, and a number of clicks generated using the user-list.

19. One or more non-transitory machine-readable storage media storing instructions that are executable by one or more processing devices to perform operations comprising:

enabling, by an application programming interface sub-system, from within a first database, search and retrieval of user-lists stored in second databases that differ from the first database and that are each provided by sources that are each different from a source of the first database, with the application programming interface sub-system enabling the search and retrieval by assigning a user-list identifier to each of the user-lists and indexing user-list identifiers in the first database;

identifying a plurality of user-lists, wherein a first user-list in the plurality of user-lists is associated with a first one of the second databases provided by a first source of the sources, and a second user-list in the plurality of user-lists is associated with a second one of the second databases that is provided by a second source of the sources, the second source being different from the first source;

searching an index in the first database for a user-list identifier assigned to one of the plurality of user-lists and indexed by the application programming interface sub-system; and providing, at least partially based on the searching, data for a user interface that displays the user-list identifier corresponding to the one of the plurality of user-lists and metadata received from the first one of the second databases and the second one of the second databases and that receives one or more instructions related to one or more of the plurality of user-lists from the first one of the second databases and the second one of the second databases.

20. The one or more non-transitory machine-readable storage media of claim 19, wherein the one or more instructions include an indication that a potential user-list subscriber requests to license or subscribe to the one or more of the plurality of user-lists.

* * * * *